US006757860B2

(12) United States Patent
Choi et al.

(10) Patent No.: US 6,757,860 B2
(45) Date of Patent: Jun. 29, 2004

(54) CHANNEL ERROR PROTECTION IMPLEMENTABLE ACROSS NETWORK LAYERS IN A COMMUNICATION SYSTEM

(75) Inventors: Jihwan Patrick Choi, Cambridge, MA (US); Hui-Ling Lou, Oakland, CA (US); Christine Irene Podilchuk, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 486 days.

(21) Appl. No.: 09/848,059

(22) Filed: May 3, 2001

(65) Prior Publication Data

US 2002/0040460 A1 Apr. 4, 2002

Related U.S. Application Data

(60) Provisional application No. 60/228,229, filed on Aug. 25, 2000.

(51) Int. Cl.[7] ...................... H03M 13/35; H03M 13/29; G06F 11/08
(52) U.S. Cl. ...................... 714/757; 714/701; 714/746; 714/755; 714/774
(58) Field of Search ................................ 714/701, 746, 714/755, 757, 774

(56) References Cited

U.S. PATENT DOCUMENTS

| | | | | | |
|---|---|---|---|---|---|
| 6,040,879 | A | * | 3/2000 | Park | 375/240.27 |
| 6,405,338 | B1 | * | 6/2002 | Sinha et al. | 714/752 |
| 6,473,396 | B1 | * | 10/2002 | Kumar | 714/11 |
| 6,621,935 | B1 | * | 9/2003 | Xin et al. | 382/253 |
| 6,625,776 | B1 | * | 9/2003 | Wright et al. | 714/774 |
| 6,629,287 | B1 | * | 9/2003 | Brink | 714/755 |
| 6,681,365 | B1 | * | 1/2004 | Anand et al. | 714/790 |

(List continued on next page.)

FOREIGN PATENT DOCUMENTS

EP  1059755 A1 * 12/2000  ............. H04L/1/00

OTHER PUBLICATIONS

A. Said et al., "A New, Fast and Efficient Image Codec Based on Set Partitioning in Hierarchical Trees," IEEE Transactions on Circuits and Systems for Video Technology, vol. 6, No. 3, pp. 243–250, Jun. 1996.

B–J. Kim et al., "Very Low Bit–Rate Embedded Video Coding with 3D Set Partitioning in Hierarchical Trees (3D SPIHT)," IEEE Transactions on Circuits and Systems for Video Technology, Special Issue on Image and Video Processing for Emerging Interactive Multimedia Services, pp. 1–30, Oct. 1999.

(List continued on next page.)

Primary Examiner—R. Stephen Dildine
(74) Attorney, Agent, or Firm—Ryan, Mason & Lewis, LLP

(57) ABSTRACT

Channel error protection is provided for a source coded bit stream in a communication system by a combination of outer channel coding and inner channel coding implemented across different network layers of the system. One or more of a number of different portions of the source coded bit stream are outer channel coded in a first network layer of the system, e.g., an application layer, using a designated outer channel code, so as to provide an outer channel coded bit stream having different levels of error protection for each of the different portions of the source coded bit stream. The outer channel coded bit stream is then inner channel coded in a second network layer of the system, e.g., a physical layer, using a designated inner channel code to thereby generate a channel coded bit stream. The channel coded bit stream may then be subject to further processing operations prior to transmission in the communication system. Advantageously, the invention allows unequal channel error protection to be provided for source coded audio, image, video or multimedia bit streams in a standard second generation (2G) or third generation (3G) wireless system in a manner which is independent of the physical layer coding infrastructure of the system.

31 Claims, 4 Drawing Sheets

U.S. PATENT DOCUMENTS

2001/0028684 A1 * 10/2001 Chung et al. ............... 714/786
2002/0178418 A1 * 11/2002 Ramprashad et al. ....... 714/755

OTHER PUBLICATIONS

B–J. Kim et al., "Low–Delay Embedded 3–D Wavelet Color Video Coding with SPIHT," Proc. SPIE, vol. 3309, pp. 955–964, 1997. International Multimedia Conference, Bristol, U.K., pp. 1–23, Sep. 1998.

U.S. patent application Ser. No. 09/680,709, A. Anand et al., filed Oct. 6, 2000, "Method And Apparatus For Video Transmission Over a Teterogeneous Network Using Progressive Video Coding.".

J. Hagenauer, "Rate Compatible Punctured Convolutional Codes (RCPC Codes) and their Applications," IEEE Transactions on Communications, vol. 36, No. 4, pp. 389–400, Apr. 1988.

* cited by examiner

| OUTER CODE | BER (INNER) | FER (INNER) | BER (OUTER) | WER (OUTER) |
|---|---|---|---|---|
| (150,142), RATE ≈ 0.95 | $10^{-3}$ | 0.048 | $2 \times 10^{-6}$ | $10^{-4}$ |
| (150,140), RATE ≈ 0.93 | $10^{-3}$ | 0.048 | $< 4 \times 10^{-8}$ | $< 4 \times 10^{-5}$ |

| OUTER CODE | BER (INNER) | FER (INNER) | BER (OUTER) | WER (OUTER) |
|---|---|---|---|---|
| (150,144), RATE ≈ 0.96 | $10^{-3}$ | 0.019 | $< 4 \times 10^{-8}$ | $< 4 \times 10^{-5}$ |
| (150,142), RATE ≈ 0.95 | $10^{-3}$ | 0.019 | $< 4 \times 10^{-8}$ | $< 4 \times 10^{-5}$ |

CHANNEL ERROR PROTECTION IMPLEMENTABLE ACROSS NETWORK LAYERS IN A COMMUNICATION SYSTEM

PRIORITY CLAIM

The present application claims the benefit of U.S. Provisional Application No. 60/228,229, filed Aug. 25, 2000 and entitled "Concatenated Error Protection Across Network Layers for Wireless Multimedia Transmission."

RELATED APPLICATIONS

The present application is related to U.S. patent application Ser. No. 09/680,708 entitled "Method and Apparatus for Providing Channel Error Protection for a Source Coded Bit Stream," which issued on Jan. 20, 2004 as U.S. Pat. No. 6,681,365, and U.S. patent application Ser. No. 09/680,709 entitled "Method And Apparatus For Video Transmission Over a Heterogeneous Network Using Progressive Video Coding," both filed Oct. 6, 2000 in the name of inventors R. Anand, H. -L. Lou and C. Podilchuk, and incorporated by reference herein.

FIELD OF THE INVENTION

The present invention relates generally to information coding, and more particularly to techniques for providing channel error protection for source coded bit streams in a wireless communication system or other type of communication system.

BACKGROUND OF THE INVENTION

Conventional second generation (2G) cellular wireless communication systems, which were designed primarily for voice services, generally do not provide a sufficiently low bit error rate (BER) and frame error rate (FER) to support high-quality audio, image or video transmission. The typical BER and FER provided in such systems is on the order of $10^{-3}$ and $10^{-1}$, respectively, as measured at the output of a channel decoder. While satisfactory voice quality can be obtained in the presence of these error rates, the rates are generally too high to allow acceptable audio, image or video quality to be obtained. By way of example, a BER of less than about $10^{-5}$ at the channel decoder output is considered desirable for digital music and video transmissions.

The bits in a given source coded bit stream (e.g., a compressed audio, image or video bit stream) often have different levels of importance in terms of their impact on reconstructed signal quality. As a result, it is generally desirable to provide different levels of channel error protection for different portions of the source coded bit stream.

Techniques for use in providing such unequal error protection (UEP) through the use of different channel codes are described in U.S. patent application Ser. No. 09/022,114, filed Feb. 11, 1998 in the name of inventors D. Sinha and C. -E. W. Sundberg and entitled "Unequal Error Protection for Perceptual Audio Coders," and subsequently issued on Jun. 11, 2002 as U.S. Pat. No. 6,405,338, which is incorporated by reference herein. In one such technique, a source coded bit stream is divided into different classes of bits, with different levels of error protection being provided for the different classes of bits. For example, a source coded bit stream may be divided into class I and class II bits, with class I bits protected by a lower rate channel code than that used to protect the class II bits.

So-called third generation (3G) cellular wireless communication systems currently under development have a target BER of about $10^{-5}$ at the channel decoder output. These 3G systems are thus being specifically designed to support the transmission of compressed audio, image and video bit streams. However, a significant problem with the 3G systems is that such systems are generally not being configured to support UEP for different portions of a given source coded bit stream. Although channel code approaches such as those described in the above-cited U.S. patent application Ser. No. 09/022,114 may be used to provide UEP in a 3G wireless system, a physical layer of the wireless system will need to be supplied with information characterizing the particular nature of the source coded bit stream it is transmitting before it can apply the appropriate channel protection to different portions of that bit stream. Incorporating a mechanism for providing the physical layer of the wireless system with information regarding the source coded bit stream will generally require some alteration in the physical layer infrastructure of the system, and is therefore undesirable.

It is apparent from the foregoing that a need exists for improved channel error protection techniques for the transmission of source coded bit streams, such as compressed audio, image or video bit streams, in 2G and 3G cellular wireless systems as well as other types of communication systems.

SUMMARY OF THE INVENTION

The present invention meets the above-described need by providing a method and apparatus for implementing channel error protection for a source coded bit stream in a wireless communication system in a manner which does not require alteration of physical layer infrastructure of the system.

In accordance with one aspect of the present invention, channel error protection is provided for a source coded bit stream in a communication system by a combination of outer channel coding and inner channel coding implemented across different network layers of the system. One or more of a number of different portions of the source coded bit stream are outer channel coded in a first network layer of the system, e.g., an application layer, using a designated outer channel code, e.g., a Reed Solomon (RS) code or other type of block code, so as to provide an outer channel coded bit stream having different levels of error protection for each of the different portions of the source coded bit stream. The different portions may correspond to designated portions of each of one or more frames of the source coded bit stream. The outer channel coded bit stream is then inner channel coded in a second network layer of the system, e.g., a physical layer, using a designated inner channel code, e.g., a convolutional code or a turbo code, to thereby generate a channel coded bit stream. The channel coded bit stream may then be subject to further processing operations prior to transmission in the communication system.

In accordance with another aspect of the present invention, code words of the outer channel coded bit stream associated with a given one of the portions of the source coded bit stream may be arranged in different modem frames of the communication system prior to application of the inner channel code.

In accordance with a further aspect of the present invention, the outer channel coding may be applied adaptively based at least in part on feedback from a receiver of the system.

Advantageously, the invention can provide sufficiently low error rates in a 2G cellular wireless system such that high-quality audio, image, video or multimedia transmission can be supported. In addition, the invention allows UEP to be provided in a standard 2G or 3G system in an efficient manner without modification of physical layer system infrastructure. Although particularly well-suited for use with progressive source coded video bit streams, the invention is more generally applicable to any type of prioritized information bit stream requiring channel error protection, including partitioned source coded bit streams and scalable, layered source coded bit streams.

DETAILED DESCRIPTION OF THE INVENTION

The following description will illustrate the invention using exemplary communication systems which process source coded bit streams. It should be understood, however, that the invention is not limited to use with any particular type of communication system or application, but is instead more generally applicable to any communication system or application in which it is desirable to provide channel error protection for a source coded bit stream in an efficient manner without requiring alteration of physical layer elements of the system.

The invention is particularly well-suited for use with progressive source coded video bit streams. However, the unequal error protection techniques described herein are also applicable to other types of progressive or otherwise prioritized bit streams, including audio, image and other information bit streams. For example, the techniques of the invention can be applied to partitioned versions of source coded bit streams generated using conventional non-progressive coding techniques such as H.261, H.263, Motion-JPEG, MPEG-1, MPEG-2, etc.

Figure 1:
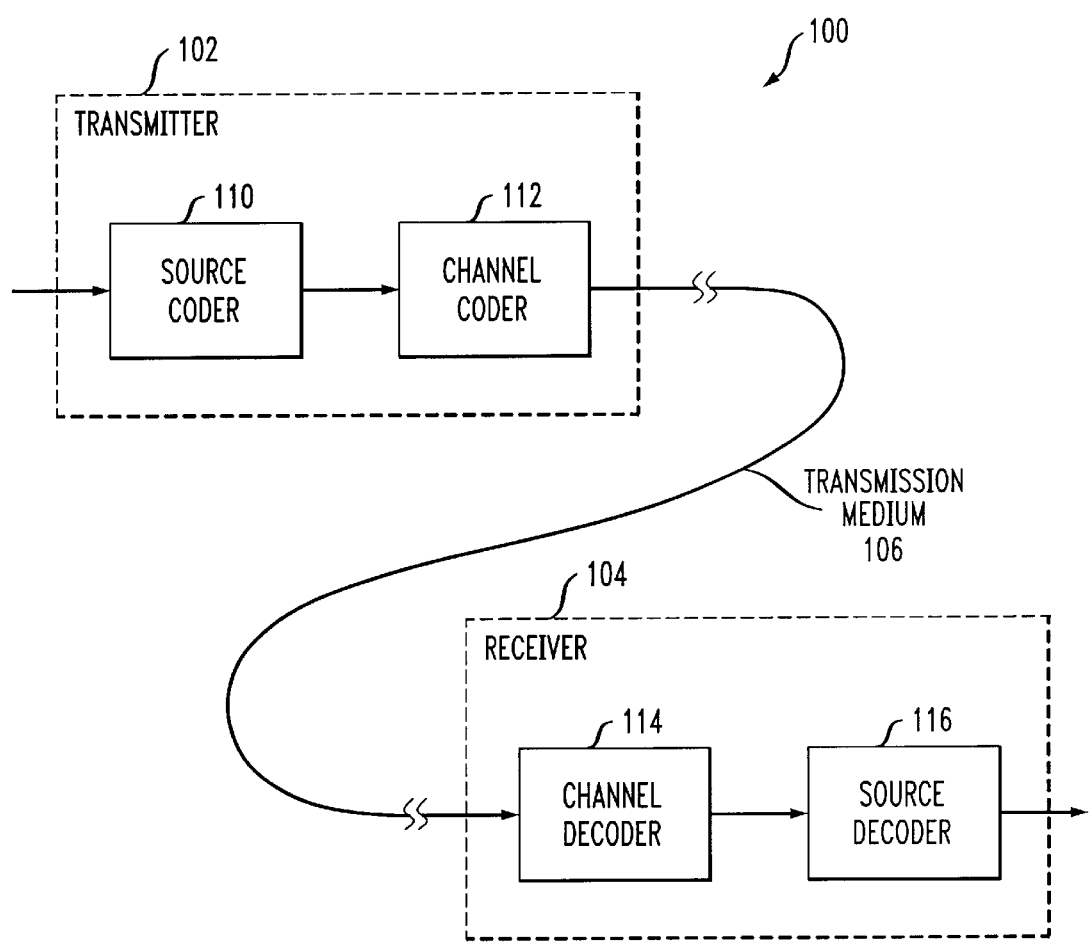
FIG. 1 shows a simplified block diagram of one type of communication system in which the present invention may be implemented.

FIG. 1 shows a simplified block diagram of an example communication system 100 in which the present invention may be implemented. The system 100 includes a transmitter 102 and a receiver 104 configured to communicate over a transmission medium 106. The transmission medium 106 may represent a portion of a wired or wireless network, combinations of different portions of such networks, or any other type of communication channel. The transmitter 102 includes a source coder 110 and a channel coder 112. The receiver 104 includes a channel decoder 114 and a source decoder 116. The source coder 110 and source decoder 116 may be a progressive video coder and video decoder, respectively, as will be described in greater detail in conjunction with FIG. 3. However, it will be appreciated that the invention is more generally applicable to other types of source coding, e.g., audio coding and image coding.

In operation, a stream of information bits is applied to the source coder 110. The source coder 110 generates a source coded bit stream using conventional techniques. The source coded bit stream is then applied to the channel coder 112, which applies unequal error protection channel coding to the source coded bit stream using the techniques of the present invention. The channel coding techniques utilized in channel coder 112 will be described in greater detail below in conjunction with FIG. 2. The output of the channel coder 112 may be further processed using conventional communication system operations such as modulation, multiplexing, upconversion, amplification, filtering, etc. These operations are omitted from the figure for simplicity and clarity of illustration. The resulting signal is passed over the transmission medium 106 and subject to complementary communication system operations in or prior to the receiver 104. The recovered channel coded bit stream is applied to channel decoder 114, and the resulting progressive source coded bit stream is decoded in source decoder 116 to obtain a reconstructed version of the original information bit stream.

The elements of the FIG. 1 system are shown in simplified form for clarity of illustration. It should be understood that one or more of these elements may be implemented using processor-based devices such as microprocessors, digital signal processors (DSPs), application-specific integrated circuits (ASICs) as well as portions or combinations of these and other devices. The invention may be implemented in whole or in part in the form of one or more software programs stored and executed by such devices. Moreover, as previously noted, the FIG. 1 system may include additional elements not explicitly shown in the figure.

The present invention provides channel error protection techniques that may be implemented in a communication system such as that illustrated in FIG. 1. In accordance with the invention, unequal channel error protection is provided for a source coded bit stream generated by source coder 110 using a channel coder which operates over both an application layer of the system and a physical layer of the system. Within the physical layer, the channel coder can be configured to utilize existing channel codes of a 2G or 3G system. The physical layer of the system does not require any knowledge of the particular nature of the source coded bit stream since, as will be described in greater detail below, outer channel code bits are applied to particular portions of the source coded bit stream in the application layer of the system. Advantageously, such an approach allows a wide variety of different channel error protection techniques for be implemented without alteration in the physical layer infrastructure of the system. The channel coding approach of the invention thus provides bandwidth-efficient UEP techniques for audio, image, video and multimedia streaming over standard compliant 2G and 3G systems.

Figure 2:
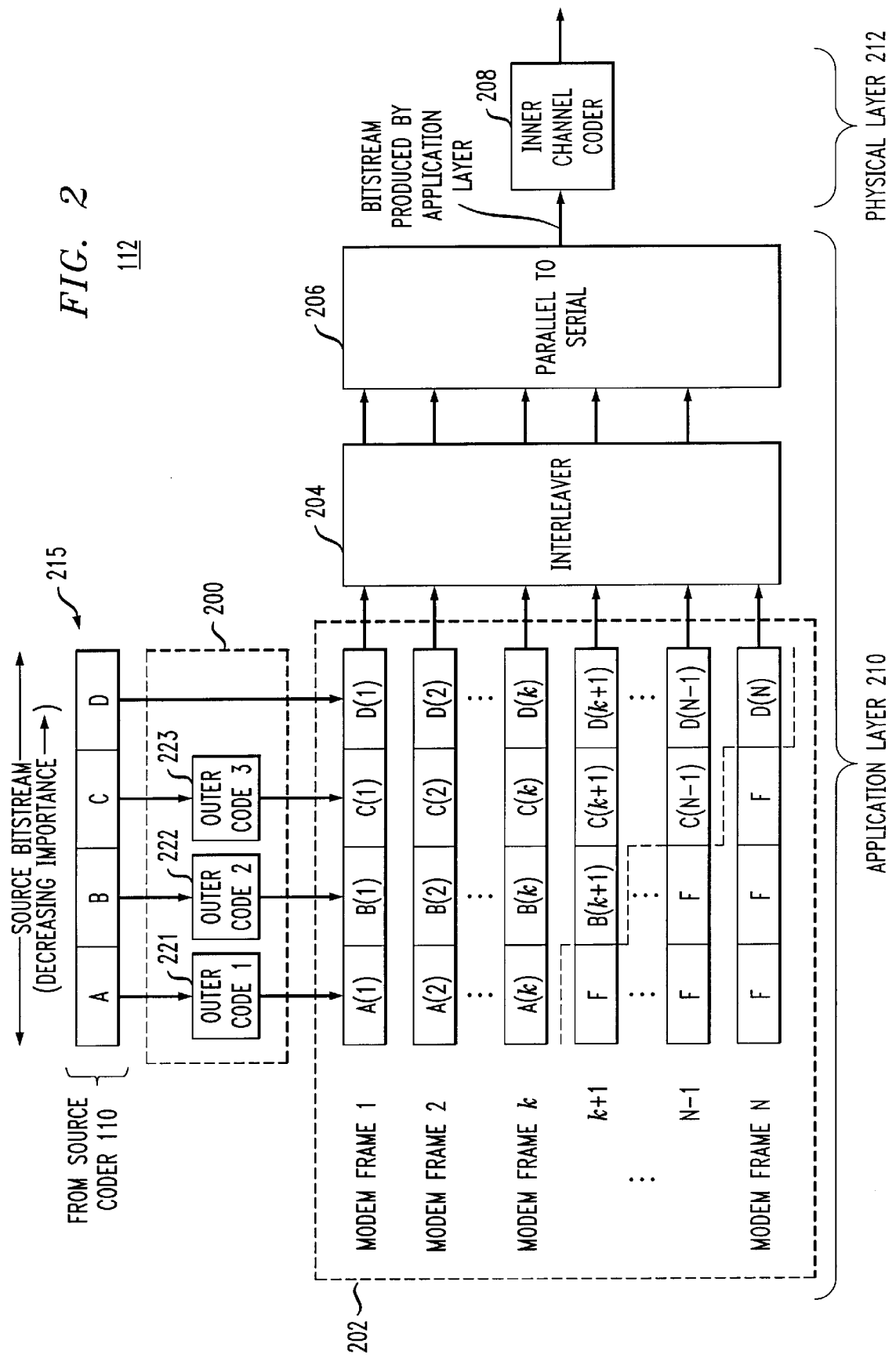
FIG. 2 shows an illustrative embodiment of a channel coder of the FIG. 1 system configured in accordance with the invention.

FIG. 2 shows a more detailed view of the channel coder 112 of FIG. 1 as configured in accordance with the present invention. The channel coder 112 in this illustrative embodiment includes an outer channel coder 200, a frame formatter 202, an interleaver 204, a parallel to serial converter 206, and an inner channel coder 208. The outer channel coder 200, frame formatter 202, interleaver 204 and parallel to serial converter 206 are associated with an application layer 210 of the system 100, while the inner channel coder 208 is associated with a physical layer 212 of the system 100. The application layer 210 and physical layer 212 are each more generally referred to as network layers. A channel coding technique involving a combination of an outer code and an inner code as in FIG. 2 may be referred to as a concatenated code.

The outer channel coder 200 receives a frame 215 of a progressive source coded bit stream from the source coder 110. In a progressive source coded bit stream, bits are generally arranged in order of decreasing importance, such that the quality of the source signal that can be reconstructed at the receiver depends upon the number of consecutively received bits.

Examples of progressive source coding techniques suitable for use in conjunction with the present invention are described in the above-cited U.S. patent application Ser. No. 09/680,709 entitled "Method And Apparatus For Video Transmission Over a Heterogeneous Network Using Progressive Video Coding," and in references such as, e.g., A. Said et al., "A New and Efficient Image Codec Based on Set Partitioning in Hierarchical Trees," IEEE Transactions on Circuits and Systems for Video Tech., June 1996; B. -J. Kim et al., "Very Low Bit-Rate Embedded Coding with 3D Set Partitioning in Hierarchical Trees," IEEE Transactions on Circuits and Systems for Video Technology, Special Issue on Image and Video Processing for Emerging Interactive Multimedia Services, September 1998; and B. -J. Kim et al., "Low-Delay Embedded Video Coding with SPIHT," Proc. SPIE, Visual Communications and Image Processing '98, pp. 955–964, January 1998, which are incorporated by reference herein.

Although described as a frame of a progressive source coded bit stream in the illustrative embodiment of FIG. 2, frame 215 may alternatively be viewed as a frame of a partitioned source coded bit stream.

In the FIG. 2 embodiment, the frame 215 of the progressive source coded bit stream is separated into four groups, denoted A, B, C and D, arranged in order of decreasing importance, with the bits in group A being the most important bits of frame 215 and the bits in group D being the least important. Each of the groups A, B, C and D is subject to a different type of outer code in the outer channel coder 200. More particularly, groups A, B and C are processed using respective outer codes 1, 2 and 3 in respective coding elements 221, 222 and 223. Group D simply passes through the coder 200 without an applied code, which may alternatively be viewed as application of a rate-1 outer code. The coder 200 is configured such that code 1 is stronger than code 2, and code 2 is stronger than code 3. As a result, the more important bits of the frame 215 are subject to the strongest outer channel code.

The outer codes utilized in outer channel coder 200 maybe, e.g., Reed-Solomon (RS) codes, cyclic redundancy check (CRC) codes, Bose-Chadhuri-Hocquenghem (BCH) codes, as well as other types of block codes. Other cyclic codes, as well as non-cyclic shortened codes, can also be used as outer codes in accordance with the invention. Combinations of these and other suitable outer channel codes may also be used.

The outer channel coded bits from outer channel coder 200 are arranged into modem frames by the frame formatter 202. Each group of N such frames includes a set of k frames that each include a kth code word of each of the channel coded groups A, B, C and D, where k is an integer less than N. For example, frame k includes code words A(k), B(k), C(k) and D(k) as shown. Additional frames within the group of N modem frames each include one or more sets of outer code parity bits, each denoted as F. More particularly, modem frame k+1 includes a set of parity bits F associated with group A and code words B(k+1), C(k+1) and D(k+1), modem frame N−1 includes a set of parity bits F associated with group A, a set of parity bits F associated with group B, and code words C(N−1) and D(N−1), and modem frame N includes a set of parity bits F associated with group A, a set of parity bits F associated with group B, a set of parity bits F associated with group C, and code word D(N). It is therefore apparent that the group of most important bits of frame 215, i.e., group A, has both the strongest outer channel code and the largest number of parity bits, and thus the strongest outer channel code protection.

The assignment of different portions of the groups A, B, C and D to different modem frames provides a certain amount of diversity for overcoming channel fading and other similar deleterious channel conditions. Additional diversity is provided by interleaver 204, which may be configured to reorder the modem frames or portions thereof in accordance with a specified interleaving pattern. In other embodiments, the interleaver 204 may be eliminated, or additional diversity may be provided using other well-known techniques.

The parallel-to-serial converter 206 converts the N interleaved outputs of the interleaver 204 to a single outer channel coded stream that is applied to inner channel coder 208. The channel coder 112 is thus configured such that the elements thereof associated with the application layer 210 operate so as to supply a single inner channel coded bit stream to the physical layer 212 of the system 100.

As previously noted, the inner channel coder 208 may be configured to apply an inner code in accordance with an 2G or 3G system standard. Channel codes such as convolutional codes and turbo codes are typically used in the physical layer of 2G and 3G wireless systems. Convolutional codes and turbo codes are described in greater detail in, e.g., G. C. Clark et al., "Error Control Coding for Digital Communications," New York: Plenum, 1981, C. Berrou et al., "Near Shannon Limit Error-Correcting Coding and Decoding: Turbo Codes," Proceedings of ICC '93, Geneva, Switzerland, pp. 1064–1070, May 1993, respectively, both of which are incorporated by reference herein. The inner channel coder 208 may thus be a conventional convolutional coder or turbo coder. Other types of inner channel codes may also be used, including block codes and coding associated with trellis coded modulation. However, convolutional codes and turbo codes are the preferred codes for use in the illustrative embodiment of the invention. The former codes can be decoded in an efficient manner using conventional Viterbi decoding, while the latter codes exhibit a longer delay and higher complexity but generally provide better performance.

One example of a non-standard convolutional code that may be used in inner channel coder 208 is a so-called rate-compatible punctured convolutional (RCPC) code, as described in J. Hagenauer, "Rate Compatible Punctured Convolutional Codes and their applications," IEEE Transactions on Communications, Vol. 36, pp. 389–400, April 1988.

It should be noted that the outer channel code applied in outer channel coder 200 in FIG. 2 adds redundancy to the progressive source coded bit stream at the expense of a reduction in the source coding bit rate. The source coding bit rate that is supportable given the addition of the outer channel code bits in the application layer 210 can be estimated as follows. Assume that the total allowable bit rate for the inner channel coded bit stream in the application layer 210 including the outer channel code bits is B kbps and that the progressive source coded bit stream is partitioned into S groups, with $P_i$ denoting the fraction of the source coded bit stream that is assigned to group i (where i=1, . . . , S) with an inner channel code rate $r_i$ being applied to this group. The source coded bit rate that can be supported is then given by $$\text{Source coding bit rate} = B \times \sum_{i=1}^{S} (P_i \times r_i). \quad (1)$$

Although four distinct levels of error protection are described in conjunction with the FIG. 2 embodiment, it will be apparent to those skilled in the art that the techniques of the present invention can be used to provide any desired number of levels of unequal channel error protection for the source coded bit stream, or even a continuous progressive unequal channel error protection for the source coded bit stream.

In an alternative embodiment of the present invention, the channel coder 112 of FIG. 2 may be configured such that the outer channel codes in element 200 are applied adaptively based on feedback from receiver 104. For example, the sets of parity bits F associated with group A in FIG. 2 may be transmitted only if the corresponding code words A(1), A(2) . . . A(k) are not received successfully in the receiver 104. Such feedback may be implemented using a conventional automatic repeat request (ARQ) functionality. When the sets of parity bits F are not transmitted due to successful receipt of the corresponding code words, other less important source bits can be sent in place of these sets of parity bits so that a better quality reconstructed source signal can be obtained. Furthermore, depending on the frame error rate (FER) at the receiver, the amount of redundancy required for the outer code in the application layer can be determined adaptively so that if channel conditions are good, a weaker outer channel code can be used and more of the source bits can be transmitted.

It will be apparent to those skilled in the art that a channel decoder corresponding to channel coder 112 of FIG. 2 will generally include elements that perform operations complementary to those described in conjunction with FIG. 2, e.g., will generally include at least an inner channel decoder followed by an outer channel decoder, as well as other elements.

Figure 3:
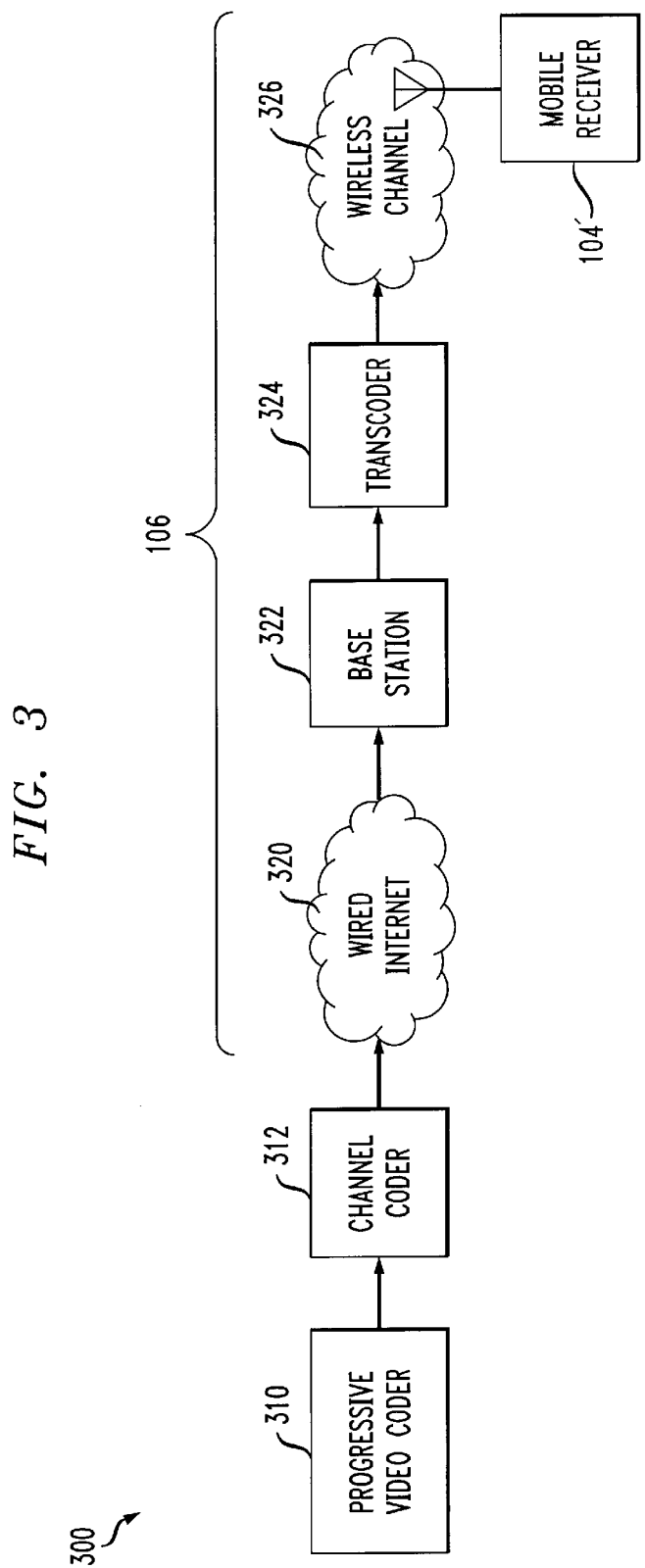
FIG. 3 shows a more specific example of the system of FIG. 1 in which the present invention may be implemented.

FIG. 3 shows a more particular example of a communication system 300 in which the above-described channel error protection can be implemented. The system 300 includes a progressive video coder 310 and a channel coder 312. The progressive video coder 310 may be a progressive video coder based on set partitioning in hierarchical trees (SPIHT), as described in the previously-cited SPIHT references. The channel coder 312 in this example is assumed to be implemented in the manner shown in FIG. 2. The transmission medium 106 in this system includes a connection through wired Internet 320 to a base station 322 of a wireless network. A transcoder 324 processes the base station output for delivery via a wireless channel 326 to a mobile receiver 104'. The mobile receiver 104' is assumed to include the channel decoder 114 and source decoder 116 of FIG. 1 as well as additional signal processing elements.

Figures 4, 5A, 5B:
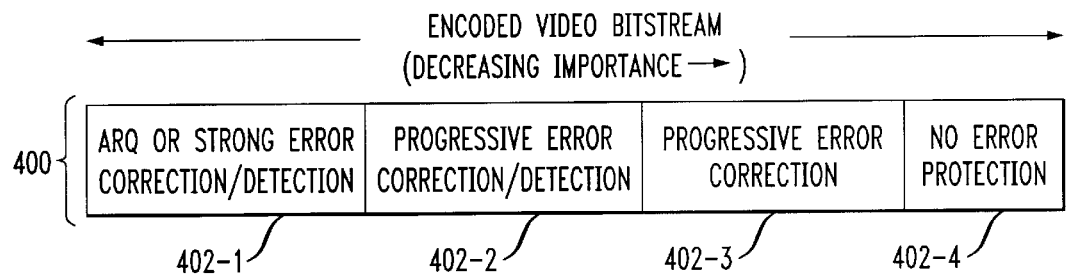
FIG. 4 shows an example of a progressive source coded video bit stream that may be generated in the system of FIG. 3.
FIGS. 5A and 5B are tabular results of a simulation of an example implementation of a system including the channel coder of FIG. 2.

FIG. 4 shows one possible example of a progressive source coded video bit stream that may be generated by the progressive video coder 310. A frame 400 of the progressive source coded video bit stream is separated into four groups denoted 402-1, 402-2, 402-3 and 402-4. Each of the four groups may be provided with a different level of error protection in accordance with techniques similar to those previously described in conjunction with FIG. 2. In this example, group 402-1 is protected with ARQ or a strong error correction and detection code, group 402-2 is protected with a progressive error correction and detection code, group 402-3 is protected with a progressive error correction code, and group 402-4 is provided with no error protection.

In operation, a progressive video bit stream such as that illustrated in FIG. 4 is generated by the progressive video coder 310. The channel coder 312 provides unequal channel error protection for the progressive source coded bit stream in the manner previously described in conjunction with FIG. 2. The resulting channel coded output is delivered via transmission medium 106 to the mobile receiver 104' where it is processed to recover the original video stream. Additional details regarding the operation of the system 300 may be found in the above-cited U.S. patent application Ser. No. 09/680,709 entitled "Method And Apparatus For Video Transmission Over a Heterogeneous Network Using Progressive Video Coding."

System 300 may also be configured such that a portion of the channel coder operations may be implemented in base station 322 or in another system element. For example, the application layer operations of FIG. 2 may be implemented in channel coder 312, with the physical layer operations of FIG. 2 implemented in base station 322, transcoder 324, or other system elements. Transcoder 324 may be eliminated in other embodiments, e.g., using the techniques described in U.S. patent application Ser. No. 09/680,709.

It should be understood that system 300 of FIG. 3 is shown by way of example only, and should not be construed as limiting the scope of the invention in any way. Those skilled in the art will recognize that the present invention can be implemented in a wide variety of different communication system configurations.

FIGS. 5A and 5B show the results of performance simulations on an example system incorporating the channel error protection techniques of the present invention. The system is assumed to be configured substantially as shown in FIGS. 1 and 2. The source coded bit stream in this example is a progressive video bit stream at a rate of 384 kbps. Two different levels of error protection are used. A given frame is therefore separated into two groups, with a different type of outer channel code applied to each group in the application layer of the system in the manner illustrated in FIG. 2. The first group represents the first 20% of the bits of the source coded frame, and the second group represents the remaining 80% of the bits. The outer channel code used for the first portion is an RS code based on $GF(2^8)$, as described in R. E. Blahut, "Principles and Practice of Information Theory," Menlo Park, Calif., Addison-Wesley, 1987, which is incorporated by reference herein. No outer coding is applied to the second group, i.e., rate-1 outer coding is used for this group.

The inner coder applied in the inner channel coder of the physical layer is a rate-½ 256-state convolutional code, as described in the above-cited G. C. Clark, Jr., et al. reference entitled "Error Control Coding for Digital Communications," which is a type of code similar to that used in a conventional 2G wireless system. The modem frame duration used is 10 milliseconds. It is assumed that the system uses coherent quadrature phase shift keying (QPSK) modulation, with perfect timing synchronization, and a transmission symbol rate of 384 kbaud and a carrier frequency of 2.1 GHz. The test environment for the performance simulation is assumed to be the test environment specified in the Universal Mobile Telecommunications System (UMTS), "Selection Procedure for the Choice of Radio Transmission Technologies of the UMTS, UMTS 30.03, Version 3.2.0, 1998, which is incorporated by reference herein, and includes a Channel A vehicular test environment and a Channel B pedestrian test environment. UMTS is one example of a conventional 2G wireless system that may make use of the techniques of the invention.

It should be emphasized that these and other assumptions referred to herein are intended for purposes of illustration only, and should not be construed as requirements or limitations of the present invention.

The required bit error rate (BER) and word error rate (WER) for the first group of the progressive video bit stream are application dependent. For streaming of short video clips, a target $BER<10^{-6}$ and a target $WER<10^{-4}$ at the output of the outer channel decoder are considered to be appropriate for this group. The appropriate (n, k) RS code based on $GF(2^8)$ that is required to achieve these BER and WER targets is determined by setting the signal-to-noise ratio (SNR) of the system so that the BER at the output of the inner channel decoder in the physical layer is $10^{-3}$.

FIGS. 5A and 5B show respective tabular listings of the simulation performance results for the above-noted UMTS Channel A vehicular test environment and UMTS Channel B pedestrian test environments. Each of the tables shows the particular (n, k) RS code used, along with the BER and FER at the output of the inner channel decoder (denoted BER (inner) and FER (inner), respectively) and the BER and WER at the output of the outer channel decoder (denoted BER (outer) and FER (outer), respectively). The BER (outer) and WER (outer) values represent overall BER and WER values achieved using both the inner and outer code.

Referring to FIG. 5A, it can be seen that in the vehicular test environment an (n, k) RS code of (150, 142) met the target for WER (outer) but fell just short of the target for BER (outer). However, a slightly stronger (150, 140) code did meet both of the targets.

From FIG. 5B is can be seen that in the pedestrian test environment (n, k) RS codes of (150, 144) and (150, 142) both met the target for WER (outer) BER (outer).

These simulation results demonstrate that only a relatively small amount of redundancy is required in the application layer in order to obtain satisfactory protection for the most important 20% of the bits in a given frame of the example progressive source coded video bitstream. For example, if a (150, 140) RS outer code is used, approximately 378 kbps of source coded video bit rate can be supported in accordance with Equation (1) above. It should be noted that although a source coded video bit rate of 384 kbps is used in this example, the channel error protection techniques of the invention can also be used with lower video bit rates.

Although a progressive stream is used for the above-described simulations, the channel error protection techniques of the invention can be applied to a partitioned source coded bit steam, a scalable, layered source coded bit stream, or any other source coded bit stream in which the data can be prioritized. An example of a layered source coded bit stream is a video bit stream having one or more frames where each additional layer enhances the video quality achieved by reconstructed previous layers. In general, the invention can be used with any bit stream that can be prioritized into two or more classes of bits.

The above-described embodiments of the invention are intended to be illustrative only. For example, the invention can be implemented using other types of outer and inner channel codes and other types of information bit streams. As a more particular example, other embodiments of the invention may utilize a pair of concatenated convolutional codes, with one of the codes serving as an outer code at the application layer and the other serving as an inner code at the physical layer. As noted previously, the invention can be used with partitioned or otherwise prioritized bit streams, i.e., bit streams prioritized into two or more classes of bits, so as to provide unequal error protection for the different classes of bits. Furthermore, the particular system configurations described in conjunction with the illustrative embodiments are shown by way of example only, and numerous alternative system configurations are possible. These and numerous other embodiments within the scope of the following claims will be apparent to those skilled in the art.

What is claimed is:

1. A method for providing channel error protection for a source coded bit stream in a communication system, the method comprising the step of:

outer channel coding each of one or more of a plurality of different portions of the source coded bit stream in a first network layer of the system using a designated outer channel code, so as to provide an outer channel coded bit stream having different levels of error protection for each of the plurality of portions of the source coded bit stream, the outer channel coding step being configured to operate in conjunction with inner channel coding of the outer channel coded bit stream in a second network layer of the system using a designated inner channel code to thereby generate a channel coded bit stream.

2. The method of claim 1 wherein the plurality of different portions correspond to designated portions of a given frame of the source coded bit stream.

3. The method of claim 1 wherein the first network layer comprises an application layer of the system and the second network layer comprises a physical layer of the system.

4. The method of claim 1 wherein the outer channel code applied to a given one of the plurality of different portions of the source coded bit stream comprises a block code.

5. The method of claim 4 wherein the block code comprises a Reed Solomon (RS) code.

6. The method of claim 1 wherein the inner channel code applied to the outer channel coded bit stream comprises at least one of a convolutional code and a turbo code.

7. The method of claim 1 wherein the outer channel code and the inner channel code are implemented as a pair of concatenated convolutional codes.

8. The method of claim 1 wherein the source coded bit stream comprises a progressive source coded bit stream having one or more frames each having a plurality of bits arranged in a particular order of importance.

9. The method of claim 1 wherein the source coded bit stream comprises a partitioned source coded bit stream having one or more frames each including the plurality of different portions arranged in a particular order of importance.

10. The method of claim 1 wherein the source coded bit stream comprises a layered source coded bit stream having one or more frames where each additional layer enhances a video quality achieved by reconstructed previous layers.

11. The method of claim 1 wherein at least one of the plurality of portions of the source coded bit stream is processed using an outer channel coding rate of 1.

12. The method of claim 1 wherein the outer channel code is applied adaptively based at least in part on feedback from a receiver of the system.

13. The method of claim 1 wherein code words of the outer channel coded bit stream associated with a given one of the portions of the source coded bit stream are arranged in different modem frames of the communication system prior to application of the inner channel code.

14. An apparatus for providing channel error protection for a source coded bit stream in a communication system, the apparatus comprising:

an outer channel coder operative to outer channel code each of one or more of a plurality of different portions of the source coded bit stream in a first network layer of the system using a designated outer channel code, so as to provide an outer channel coded bit stream having different levels of error protection for each of the plurality of portions of the source coded bit stream, the outer channel coder being configured to operate in conjunction with an inner channel coder having an input adapted for coupling to one or more outputs of the outer channel coder, the inner channel coder operative to inner channel code the outer channel coded bit stream in a second network layer of the system using a designated inner channel code to thereby generate a channel coded bit stream.

15. The apparatus of claim 14 wherein the plurality of different portions correspond to designated portions of a given frame of the source coded bit stream.

16. The apparatus of claim 14 wherein the first network layer comprises an application layer of the system and the second network layer comprises a physical layer of the system.

17. The apparatus of claim 14 wherein the outer channel code applied to a given one of the plurality of different portions of the source coded bit stream comprises a block code.

18. The apparatus of claim 17 wherein the block code comprises a Reed Solomon (RS) code.

19. The apparatus of claim 14 wherein the inner channel code applied to the outer channel coded bit stream comprises at least one of a convolutional code and a turbo code.

20. The apparatus of claim 14 wherein the outer channel code and the inner channel code are implemented as a pair of concatenated convolutional codes.

21. The apparatus of claim 14 wherein the source coded bit stream comprises a progressive source coded bit stream having one or more frames each having a plurality of bits arranged in a particular order of importance.

22. The apparatus of claim 14 wherein the source coded bit stream comprises a partitioned source coded bit stream having one or more frames each including the plurality of different portions arranged in a particular order of importance.

23. The apparatus of claim 14 wherein the source coded bit stream comprises a layered source coded bit stream having one or more frames where each additional layer enhances a video quality achieved by reconstructed previous layers.

24. The apparatus of claim 14 wherein at least one of the plurality of portions of the source coded bit stream is processed using an outer channel coding rate of 1.

25. The apparatus of claim 14 wherein the outer channel code is applied adaptively based at least in part on feedback from a receiver of the system.

26. The apparatus of claim 14 further including a frame formatter coupled between the one or more outputs of the outer channel coder and the input of the inner channel coder, the frame formatter being operative to arrange code words generated by the outer channel coder and associated with a given one of the portions of the source coded bit stream in different modem frames of the communication system prior to application of the inner channel code in the inner channel coder.

27. The apparatus of claim 14 further comprising an interleaver coupled between the one or more outputs of the outer channel coder and the input of the inner channel coder.

28. The apparatus of claim 14 further comprising a parallel to serial converter coupled between the one or more outputs of the outer channel coder and the input of the inner channel coder.

29. An article of manufacture comprising a storage medium for storing one or more software programs for use in providing channel error protection for a source coded bit stream in a communication system, wherein the one or more programs when executed implement the step of:

outer channel coding each of one or more of a plurality of different portions of the source coded bit stream in a first network layer of the system using a designated outer channel code, so as to provide an outer channel coded bit stream having different levels of error protection for each of the plurality of portions of the source coded bit stream;

wherein the outer channel coded bit stream is inner channel coded in a second network layer of the system using a designated inner channel code to thereby generate a channel coded bit stream.

30. A method for providing channel error protection for a source coded bit stream in a communication system, the method comprising the step of:

outer channel coding each of one or more of a plurality of different portions of the source coded bit stream in a first network layer of the system using a designated outer channel code, so as to provide an outer channel coded bit stream having different levels of error protection for each of the plurality of portions of the source coded bit stream; and inner channel coding the outer channel coded bit stream in a second network layer of the system using a designated inner channel code to thereby generate a channel coded bit stream;

wherein the channel coded bit stream is transmitted in the communication system.

31. An apparatus for providing channel error protection for a source coded bit stream in a communication system, the apparatus comprising:

an outer channel coder operative to outer channel code each of one or more of a plurality of different portions of the source coded bit stream in a first network layer of the system using a designated outer channel code, so as to provide an outer channel coded bit stream having different levels of error protection for each of the plurality of portions of the source coded bit stream; and an inner channel coder having an input coupled to one or more outputs of the outer channel coder, the inner channel coder operative to inner channel code the outer channel coded bit stream in a second network layer of the system using a designated inner channel code to thereby generate a channel coded bit stream;

wherein the channel coded bit stream is transmitted in the communication system.

* * * * *